US010338937B2

(12) United States Patent
Rist et al.

(10) Patent No.: US 10,338,937 B2
(45) Date of Patent: Jul. 2, 2019

(54) MULTI-PANE GRAPHICAL USER INTERFACE WITH DYNAMIC PANES TO PRESENT WEB DATA

(75) Inventors: Jason E. Rist, Denver, CO (US); Shannon Ray Hughes, Fuquay Varina, NC (US)

(73) Assignee: Red Hat, Inc., Raleigh, NC (US)

( * ) Notice: Subject to any disclaimer, the term of this patent is extended or adjusted under 35 U.S.C. 154(b) by 930 days.

(21) Appl. No.: 13/307,577

(22) Filed: Nov. 30, 2011

(65) Prior Publication Data
US 2013/0139096 A1 May 30, 2013

(51) Int. Cl.
G06F 9/451 (2018.01)
G06F 3/0482 (2013.01)
G06F 9/44 (2018.01)

(52) U.S. Cl.
CPC ............ G06F 9/451 (2018.02); G06F 3/0482 (2013.01); G06F 9/4443 (2013.01)

(58) Field of Classification Search
CPC ....... G06F 3/0482; G06F 9/451; G06F 9/4443
USPC .................................................. 715/783, 845
See application file for complete search history.

(56) References Cited

U.S. PATENT DOCUMENTS

| 5,864,666 | A | * | 1/1999 | Shrader | ........................... 726/15 |
| 5,956,715 | A | * | 9/1999 | Glasser | ............ G06F 17/30221 |
| 6,009,475 | A | * | 12/1999 | Shrader | ............... H04L 63/0227 |
| | | | | | 709/217 |
| 7,975,019 | B1 | * | 7/2011 | Green | ................ G06Q 30/0241 |
| | | | | | 705/14.4 |
| 2004/0243942 | A1 | * | 12/2004 | Cortright | ...................... 715/769 |
| 2005/0055583 | A1 | * | 3/2005 | Tanaka | ................... G06Q 10/10 |
| | | | | | 726/19 |
| 2005/0060664 | A1 | * | 3/2005 | Rogers | .................. G06F 3/0481 |
| | | | | | 715/810 |
| 2006/0294476 | A1 | * | 12/2006 | Buckley | ............ G06F 17/30716 |
| | | | | | 715/781 |
| 2007/0283267 | A1 | * | 12/2007 | Jeffery | .............. G06F 17/30011 |
| | | | | | 715/710 |
| 2008/0163260 | A1 | * | 7/2008 | Lin | ......................... G06Q 40/02 |
| | | | | | 719/320 |
| 2009/0044020 | A1 | * | 2/2009 | Laidlaw et al. | .............. 713/176 |
| 2009/0183112 | A1 | * | 7/2009 | Higgins | ................. G06Q 30/02 |
| | | | | | 715/808 |
| 2009/0248850 | A1 | * | 10/2009 | Thangadurai et al. | ....... 709/224 |

(Continued)

OTHER PUBLICATIONS

Twitter.com, "Meet the new Twitter.com," as downloaded on Nov. 30, 2011 from http://twitter.com/newtwitter, 2 pages.

Primary Examiner — Aaron Lowenberger
(74) Attorney, Agent, or Firm — Lowenstein Sandler LLP

(57) ABSTRACT

A server computing system provides a web application graphical user interface (GUI) that has a first pane and a second pane. The first pane includes data items of the web application. When a user selects multiple data items in the first pane, the second pane identifies the actions that are available for the data items that are selected in the first pane. When an action is selected in the second pane, the data items in the first pane are modified in response to the selection without a web browser refreshing or reloading a corresponding web page. The server computing system receives a user request for additional information for a data item in the first pane and provides the additional information in a third pane that is together with the first pane in the GUI without the web browser refreshing or reloading the corresponding web page.

15 Claims, 11 Drawing Sheets

(56) References Cited

U.S. PATENT DOCUMENTS

| | | | |
|---|---|---|---|
| 2010/0131880 A1* | 5/2010 | Lee | G06F 3/04817 |
| | | | 715/769 |
| 2010/0325569 A1* | 12/2010 | King | G06F 8/75 |
| | | | 715/771 |
| 2010/0332565 A1* | 12/2010 | Al-Shaykh | G06F 17/30905 |
| | | | 707/912 |
| 2011/0010669 A1* | 1/2011 | Basu et al. | 715/825 |
| 2011/0047484 A1* | 2/2011 | Mount et al. | 715/753 |
| 2011/0320411 A1* | 12/2011 | Henderson | 707/687 |
| 2014/0033118 A1* | 1/2014 | Baird | 715/800 |

* cited by examiner

MULTI-PANE GRAPHICAL USER INTERFACE WITH DYNAMIC PANES TO PRESENT WEB DATA

TECHNICAL FIELD

Embodiments of the present invention relate to presenting web data. Specifically, the embodiments of the present invention relate to presenting web data using a multi-pane graphical user interface with dynamic panes.

BACKGROUND

Web pages are usually composed of tens or even hundreds of the different resources such as text, images, style sheets, JavaScript etc. Traditionally, for each of these resources, a network connection, i.e. request/response, is established between a client and a web server. This connection generally uses transmission control protocol (TCP) to create a reliable path through the network between the client and the web server. Hence, for every request/response from the browser to the server for a resource or a file, a new TCP connection should be established. Typically, a system administrator interacting with various graphical user interfaces (GUIs) provided by a web-based system management tool experiences multiple web page reloads and web page refreshes. The web page reloads and refreshes may result in server communication delays. Such operations are expensive for network hardware (e.g. switches and routers) and takes a relatively long time to wait for the page to render.

Many times a system administrator may need to leave one web page to access data on a different web page to perform a system administration task. For example, a system administrator may visit a first web page to initially locate the data he/she needs. The first web page may present a table having columns and rows of data to the system administrator. To access additional details, the system administrator may click on a row in the table, which results in loading a new web page. The system administrator can view the additional details that were not available on the first web page in the new web page. The system administrator, however, may need to also view data in the first web page while he/she is viewing the details in the new web page. System administrators that use conventional solutions tend to lose the context of their tasks when he/she is moved from a previous web page to a new web page.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for presenting and dynamically updating data using a multi-pane graphical user interface (GUI) with dynamic panes in the same window without refreshing or reloading a corresponding web page. A server computing system provides a web application graphical user interface that has a first pane and a second pane. The first pane includes data items of the web application. When a user selects multiple data items in the first pane, the second pane identifies the actions that are available on the data items that are in the first pane. When an action is selected in the second pane, the data items in the first pane are modified in response to the selection without a web browser refreshing or reloading a corresponding web page. The server computing system may also receive a user request for additional information for a data item from the set in the first pane and present the additional information in a third pane that is together with the first pane in the GUI without a web browser refreshing or reloading the corresponding web page. The server computing system and a client computing system communicate via a back-end server connection system. The back-end connection system can include client-side scripting and a back-end communication framework to allow the client to send data to, and retrieve data from, the server asynchronously (in the background) without interfering with the display and behavior of the web page.

Embodiments of the present invention reduce server communication delays by providing a web application user interface that dynamically presents and updates data in user interface panes without causing web page reloads and web page refreshes. Embodiments enable a user to interact with the web application to perform operations, such as system administration operations, using a GUI having multiple panes that are dynamically updated to reflect operation performance results.

Figure 1:
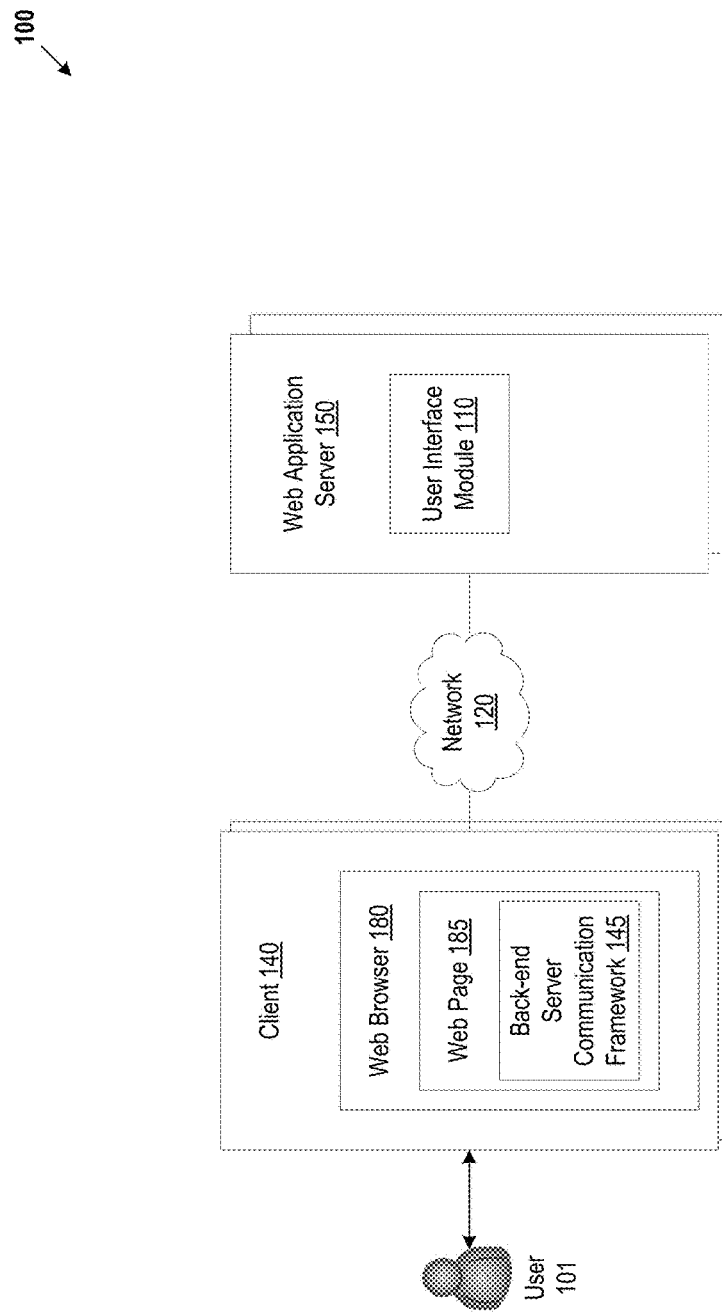
FIG. 1 is an exemplary network architecture in which embodiments of the present invention may operate.

FIG. 1 is an exemplary network architecture 100 in which embodiments of the present invention can be implemented. The network architecture 100 can include one or more clients 140 communicating via a network 120 to one or more web application servers 150. A client 140 can be hosted by any type of computing device including server computers, gateway computers, desktop computers, laptop computers, mobile communications devices, cell phones, smart phones, hand-held computers, or similar computing device. The network 120 can be a public network (e.g., Internet) or a private network (e.g., a local area network (LAN)).

A user 101, such as a web user, can use a client 140 to access content hosted by a web application server 150. A web application server 150 can be hosted by any type of computing device including server computers, gateway computers, desktop computers, laptop computers, hand-held computers or similar computing device. For example, the user 101 may wish to perform system administration operations and may request specific web pages of a system administration web application, which when rendered by a browser 180 or a similar web-page rendering application, provide graphical user interfaces (GUIs) that allow the user 101 to perform system administration operations.

The web application server 150 can include a user interface module 110 to provide a web application GUI (e.g., via web page 185) that includes multiple panes to present data for the web application. A web page can include a back-end server communication framework 145 to communicate with the user interface module 110 to present data in the GUI without reloading or refreshing the corresponding web page 185. The back-end server communication framework 145 can include a script to establish a back-end server connection with the user interface module 110 to communicate asynchronously (in the background) without interfering with the display and behavior of the existing web page 185. Examples of a back-end server communication framework 145 can include, and are not limited to, any combination of JavaScript, Asynchronous JavaScript and XML (AJAX), jQuery, and Java applets.

The user interface module 110 can receive an asynchronous call from the web page 185 via the back-end server communication framework 145. The call can be a request can be for specific data items, for additional information on one of the data items in the GUI or to perform one or more actions on one or more data items in the GUI. In one embodiment, the user interface module 110 initially provides, based on a specific web page 185, two panes in the same window in the GUI. A first pane can allow a user to select one or more data items to perform one or more actions on the selected data item(s). The first pane is hereinafter also referred to as a data item pane. When a user selects more than one data item in the first pane, rather than opening a new window, the back-end server communication framework 145 can communicate with the user interface module 110 to dynamically present actions in the second pane in the same window as the first pane without a web browser 180 reloading or refreshing the corresponding web page 185. The second pane is hereinafter also referred to as a multi-selection pane. The actions in the multi-selection pane (second pane) are actions that are available for execution on all of the data items that are selected in the data item pane (first pane).

For example, a user selects four data items in the data item pane and, in response to the user selection, the back-end server communication framework 145 retrieves data from the user interface module 110 and dynamically updates the data in the multi-selection pane without the web browser 180 reloading or refreshing the corresponding web page 185. The data in the multi-selection pane is updated based on data received from the user interface module 110 via a back-end server connection to present a delete action in the multi-selection pane to allow a user to delete the four items that are selected in the data item pane. A user may select the delete action in the multi-selection pane and the user interface module 110 can perform the delete operation. The back-end server communication framework 145 can receive a response from the user interface module 110 that includes data to be presented in the first pane in response to the action performed. The data can reflect that the requested items have been deleted. The back-end server communication framework 145 can provide the data to the web browser 180 and the browser 180 can present the data in the first pane without reloading or refreshing the web page 185.

Since the data in the panes is visible in the same window in the GUI, a user can select an action (e.g., delete) and can immediately see the result of the action being performed in the same window. Thus, a user 101 can interact with the web page 185 to perform operations without leaving the web page 185 and within the same window, and without the web browser 180 reloading or refreshing the web page 185. The client 140 and web application server 150 can use a minimal amount of client resources (e.g., memory, network bandwidth, etc.) and server resources (e.g., memory, network bandwidth, etc.) by reducing web page 185 reloads and refreshes.

Figure 2:
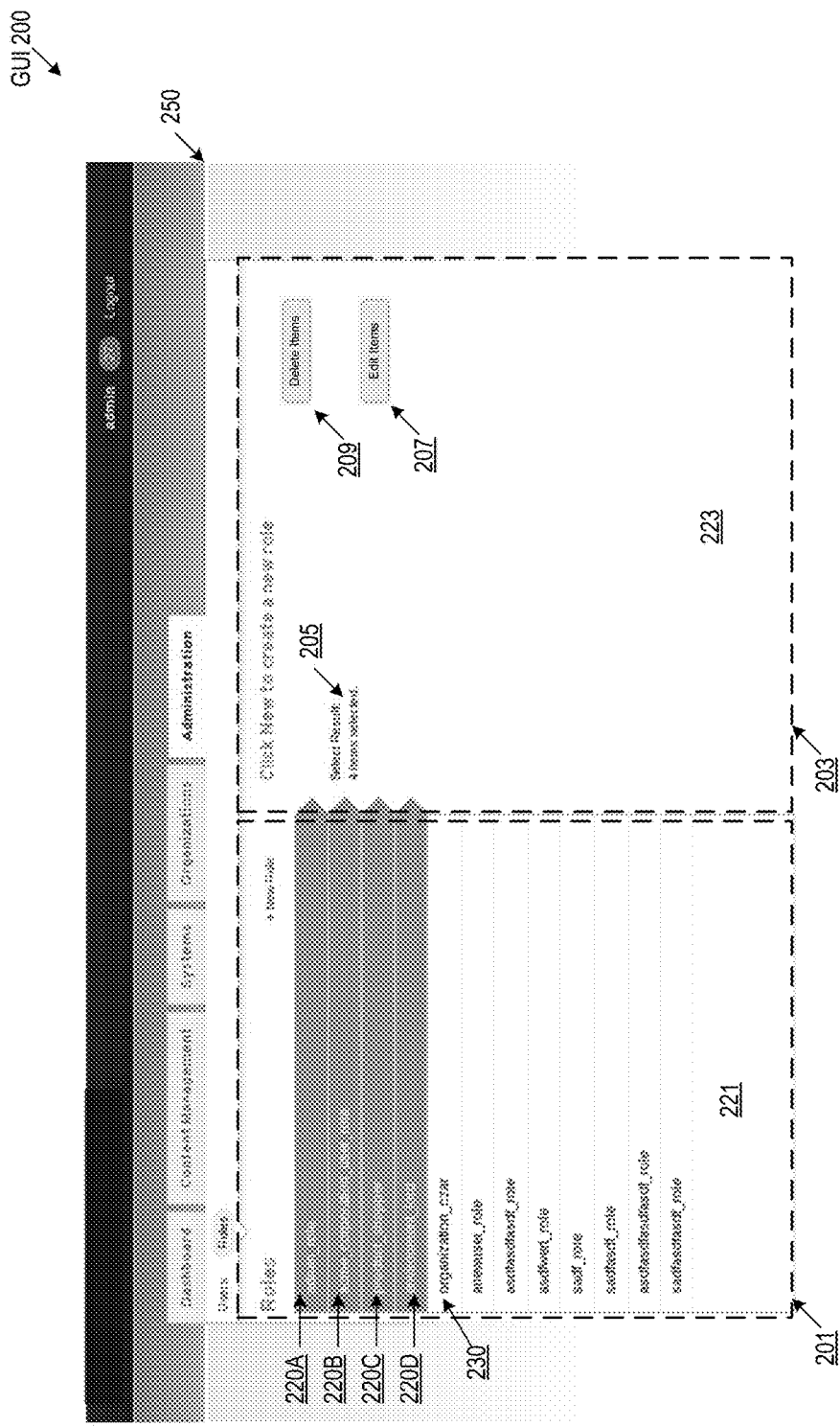
FIG. 2 is an exemplary graphical user interface (GUI) including a first pane and a second pane in a window.

In another example, when a user selects a single data item in the data item pane, rather than opening a new window, the back-end server communication framework 145 can receive data from the user interface module 110, and provide the data to the web browser 180. The web browser 180 can then dynamically present the data in a third pane in the same window as the first pane without refreshing or reloading the web page 185. The third pane can provide additional information for the data item that is selected in the first pane. The third pane is hereinafter also referred to as a single-selection pane. In one embodiment, the web browser 180 presents the single-selection pane in a layer on top of the multi-selection pane in the same window as the data item pane to present detailed information about the data item that is selected in the data item pane. The third pane can also present actions that can be performed on the selected data item. FIG. 2 is an exemplary GUI 200 including a data item pane 221 and a multi-selection pane 223 in a window 250. The data item pane 221 is in a first location 201 in the window 250 and a multi-selection pane 223 is in a second location 203 in the same window 250. The data item pane 221 includes a list of system administration data items, such as system administration roles. A user has selected four data items 220A-D in the data item pane 221 and the multi-selection pane 223 includes user interface elements items 207,209 (e.g., text, text box, button, hyperlink, drop-down list, list box, etc.) to receive user input of an action to perform on the data items 220A-D that are selected in the data item pane 221. Examples of an action can include, and are not limited to, updating a data item, editing a data item, and deleting a data item. For example, the multi-selection pane 223 includes a button 207 to receive user input to edit the four selected data items 220A-D and a button 209 to receive user input to delete the four selected data items 220A-D. The multi-selection pane 223 can also include data 205 describing the selection of the four data items 220A-D.

Figure 3:
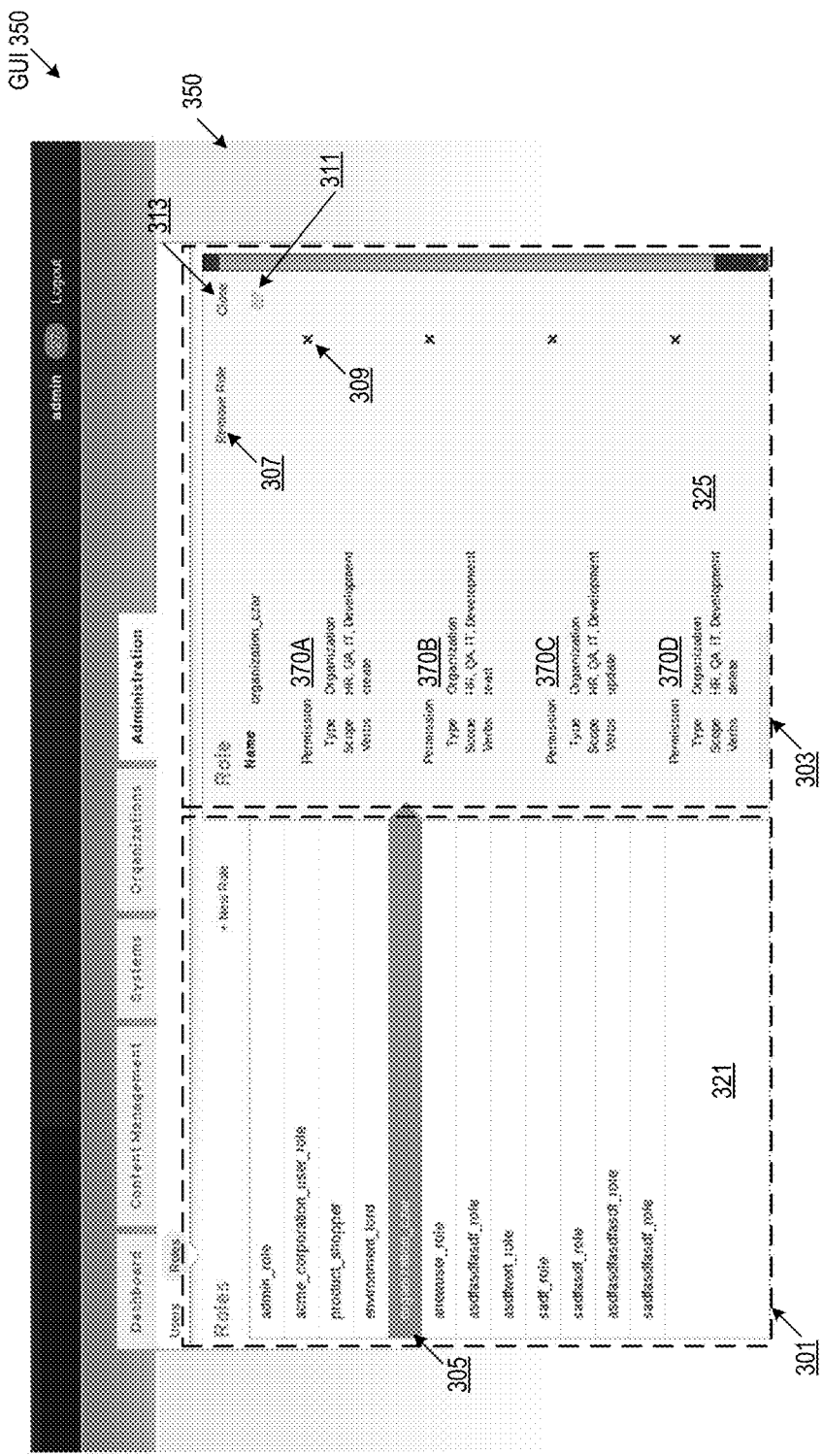
FIG. 3 is exemplary GUI including a first pane in a window, and a third pane in a layer on top of a second pane in the same window.

The user may wish to delete the four selected data items, but does not know whether or not to select a fifth data item 230 in the data item pane 221 in order to delete the fifth data item 230 with the other four data items 220A-D that were selected. The user can identify the data item of interest (e.g., organization_czar 230) and select the single data item 230 to request additional information for the data item 230. In response to the request, the back-end server communication framework hosted by a client sends a request for the additional information to a user interface module hosted by a server via a back-end server connection. The user interface module provides the additional information to the back-end server communication framework via the back-end server connection. The back-end server communication framework provides the additional information to a web browser, which presents a single-selection pane in a layer on top of the multi-selection pane 223 in the same window 250 as the data item pane 221 to present the additional information about the data item (e.g., organization_czar 230) that is selected in the data item pane. FIG. 3 is exemplary GUI 300 including a data item pane 321 in a window 350, and a single-selection pane 325 in a layer on top of a multi-selection pane in the same window 350. The data item pane 321 is in a first location 301 in the window 350 and a single-selection pane 325 is in a second location 303 in the same window 350. The single-selection pane 325 is in a layer on top of the multi-selection pane in the second location 303 in the same window 350 and covers the multi-selection pane. The single-selection pane 325 includes data pertaining to the selected data item 305, such as the permissions 370A-D that are granted to the role "organization_czar" that is selected in the data item pane 321. The user can use the additional information (e.g., permission 370A-D) for the selected item organization_czar 305 to determine whether or not to delete this item. The single-selection pane 325 can also include user interface elements to identify actions available for execution for the selected data item 305, such as a text element 307 for removing the role 'organization_czar', one or more icons 309 to delete a permission pertaining to the selected role 305, an icon 311 to edit the selected role 305, and a text element 313 to close the single-selection pane 325.

Figure 4:
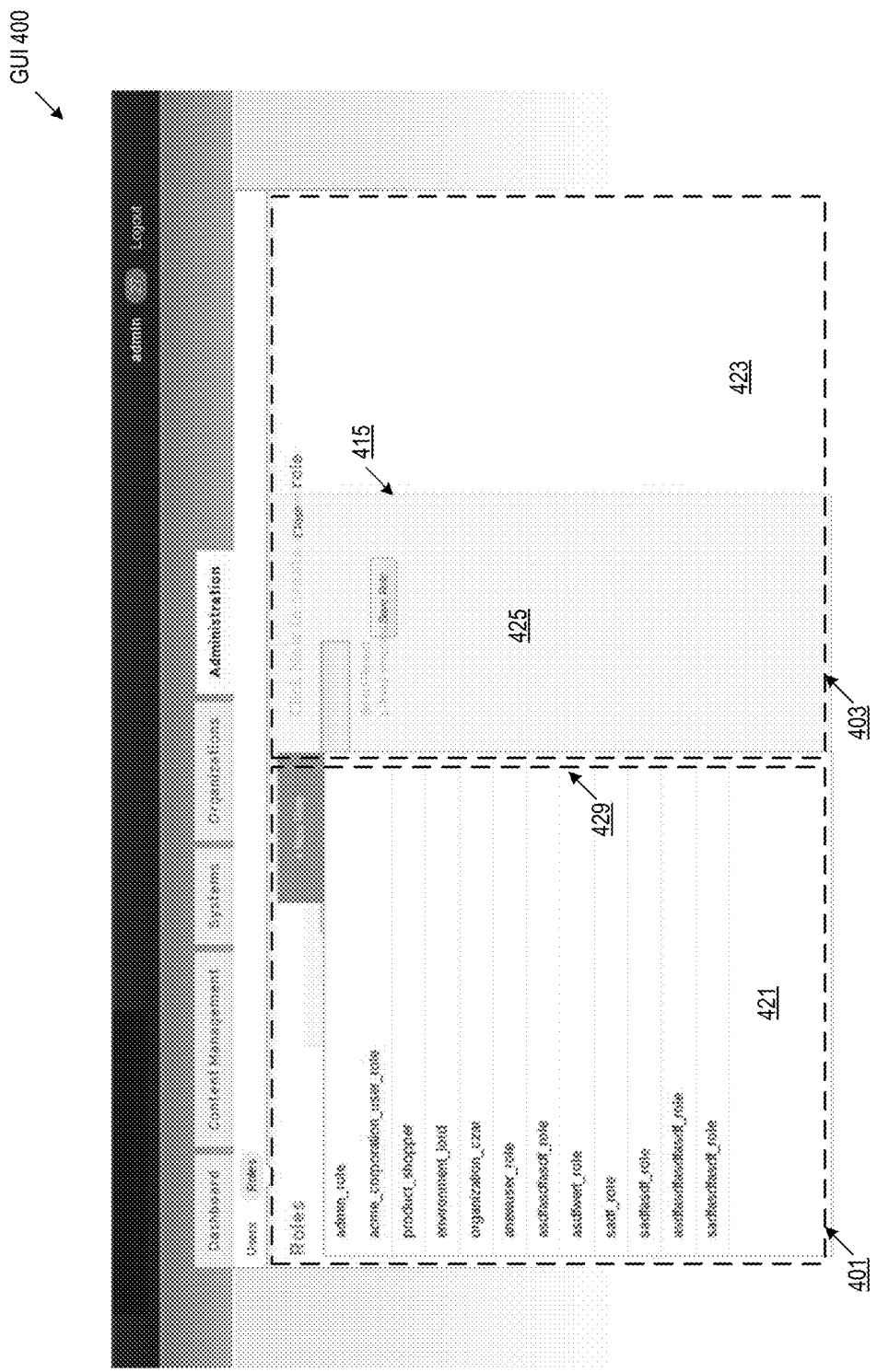
FIG. 4 is an exemplary GUI where a third pane is being removed from the GUI.

A user may select the text element 313 to close the single-selection pane 325. FIG. 4 is an exemplary GUI 400 where a single-selection pane is being removed from the GUI 400. GUI 400 includes a data item pane 421 in a first location 401 and a single-selection pane 425 being removed from a second location 403 to uncover a multi-selection pane 423 that is in a layer beneath the single-selection pane 425. In the GUI 400, the single-selection pane is dynamically being removed from the GUI 400, for example, by sliding the single-selection pane 425 from right-to-left. GUI 400 shows the right edge 415 of the single-selection pane 425 as it is sliding from right to left to vanish into the right edge 429 of the data item pane 421. As the single-selection pane 425 is sliding from right to left, more of the multi-selection pane 423, which is in a layer underneath the single-selection pane 425, is revealed in the GUI 400.

Figure 5:
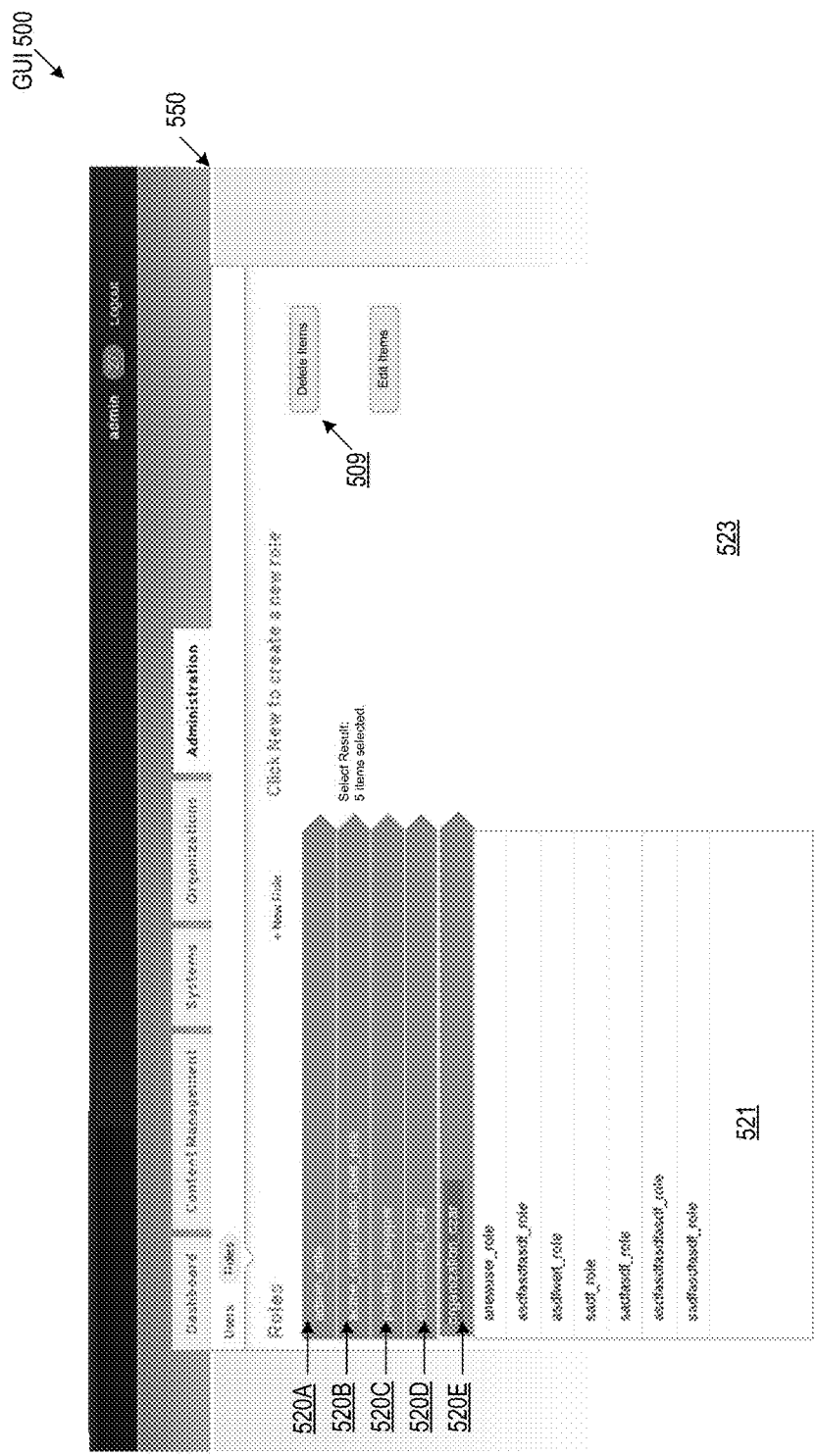
FIG. 5 is an exemplary GUI including a first pane and a second pane in a window.
Figure 6:
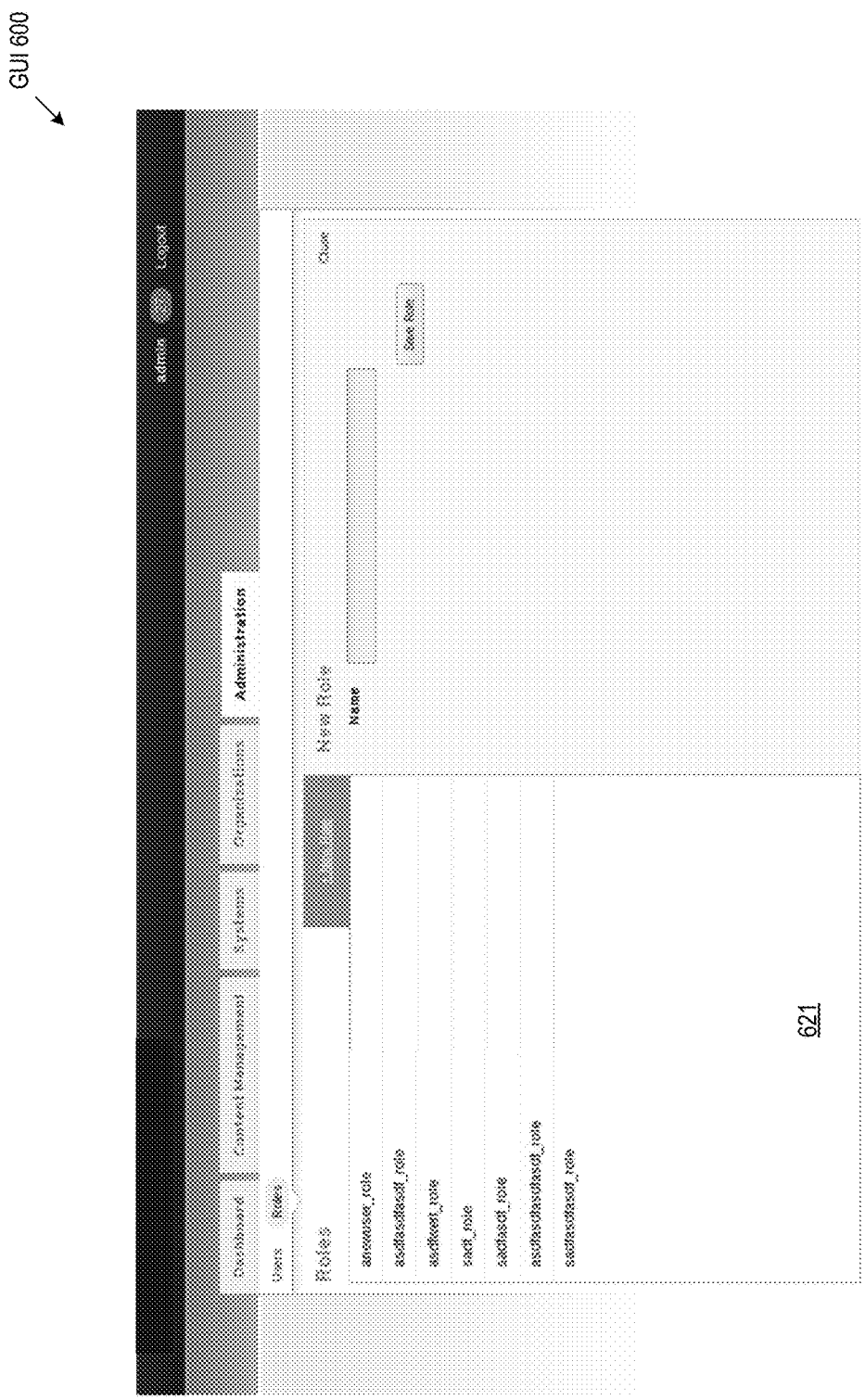
FIG. 6 is an exemplary GUI including a first pane that is dynamically updated to reflect an action that was performed.

Returning to FIG. 1, the back-end server communication framework 145 can receive data that is a result from performing an action from the user interface module 110 via a back-end server connection and can present the data items in the data item panel to reflect the performed action(s). FIG. 5 is an exemplary GUI 500 including a data item pane 521 and a multi-selection pane 523 in a window 550. A user has selected five data items 520A-E in the data item pane 521 and selected the delete button 509 to delete the five selected data items 520A-E. In response to the delete selection, the user interface module 110 performs the delete operation on the five selected data items 520A-E in a database that is coupled to the user interface module and provides data to the web browser via a back-end server connection to dynamically update the data in the data item pane 521 to show the items are deleted without reloading or refreshing a corresponding web page. FIG. 6 is an exemplary GUI 600 including a data item pane 621 that is dynamically updated without refreshing or reloading a corresponding web page to reflect an action that was performed. For example, the data item pane 621 shows that the five selected items (e.g., data items 520A-E in FIG. 5) are deleted.

Figure 7:
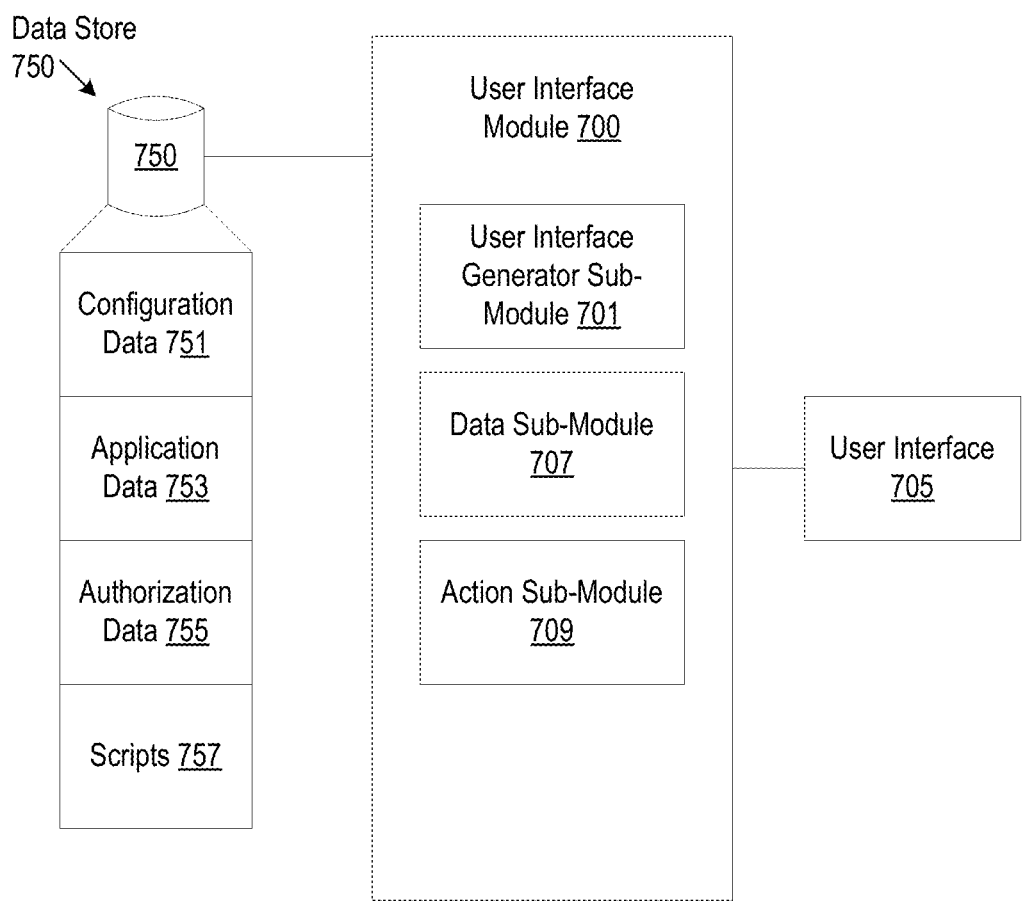
FIG. 7 is a block diagram of one embodiment of a user interface module.

FIG. 7 is a block diagram of one embodiment of a user interface (UI) module 700 for presenting and dynamically updating data using a multi-pane graphical user interface (GUI) with dynamic panes in the same window without refreshing or reloading a corresponding web page. In one embodiment, the UI module 700 can be the same as the UI module 110 hosted by a server 150 of FIG. 1 and can include a UI generator sub-module 701, a data sub-module 707, and an action sub-module 709.

Figure 8A:
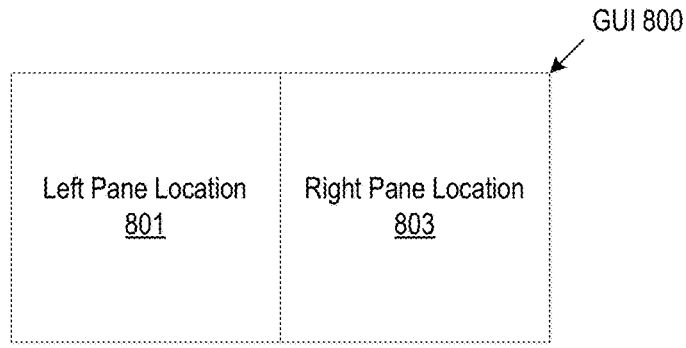
FIGS. 8A-C are exemplary graphical user interfaces having multiple pane locations.
Figure 8B:
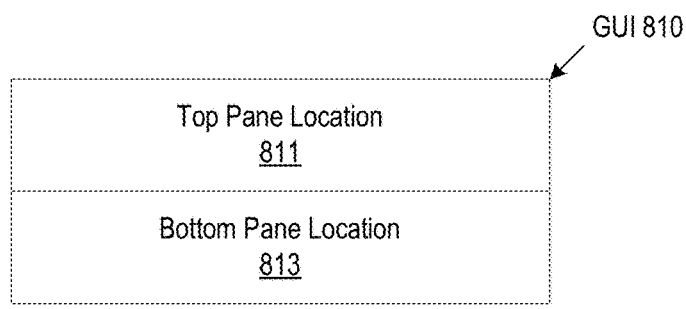
Figure 8C:
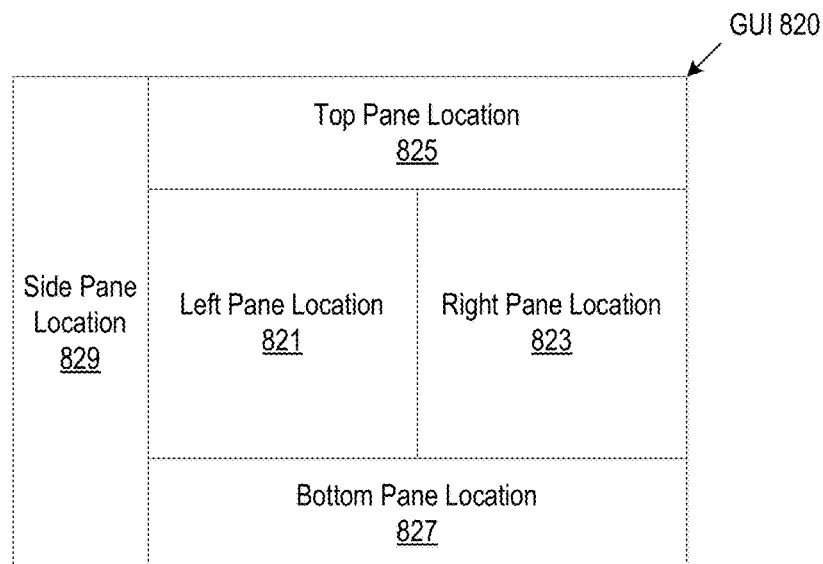

The UI generator sub-module 701 can generate a user interface 705 for a specific web page. The user interface 705 can be a GUI that includes multiple pane locations. FIG. 8A is an exemplary GUI 800 having two pane locations 801,803 that are side-by-side horizontally. FIG. 8B is an exemplary GUI 810 having two panes locations 811,813 that are side-by-side vertically. FIG. 8C is an exemplary GUI 820 having a combination of a left pane location 821, a right pane location 823, a top pane location 825, a bottom pane location 827, and a side pane location 829. A GUI can have any combination of left, right, top, bottom, and side pane locations. Returning to FIG. 7, the UI generator sub-module 701 can associate one or more scripts with a web page. A script is a client-executable script. When a user sends a request for data, via a web browser, the UI generator 701 can send a response specifying a web page and the one or more associated scripts to the web browser. For example, a web page can be sent to a client and the script(s) for the requested web page can be sent in an external file (e.g., .js file) or embedded as part of code of the requested web page. The client-executable script, when executed on the client, can establish a back-end server connection with a server to exchange data with the server via the back-end server connection. The user interface module 700 can communicate with a client asynchronously (in the background), without reloading or refreshing a web page. Examples of a back-end server communication framework can include, and are not limited to, Asynchronous JavaScript and XML (AJAX), jQuery, and Java applets.

The data sub-module 707 can provide data to a browser via a back-end server connection. The data is to be presented in a pane in the GUI without the web browser refreshing or reloading a corresponding web page. The data sub-module 707 can receive a request for data from a client via a back-end server connection and can access application data 753 that is stored in the data store 750 to determine which data to provide in response to the request. The application data 753 can be stored in a database that is coupled to the user interface module 700. Examples of application data 753 can include various web application data, such as, and not limited to, system administration data, content management data, system data, and organizational data. The request can include data item identifiers. The data sub-module 707 can search the application data 753 based on the data item identifiers. The data sub-module 707 can generate a response that includes the requested data and can send the response to the client via the back-end server connection. For example, a request may be for additional data for a data item that is identified and the response can be the additional data identifying for the data item.

A data store 750 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The action sub-module 709 can receive a request from a client via the back-end server connection for actions that are available for execution on a particular set of data items. For example, the user selects four data items and the request is for actions that are available for execution on the four data items. The request can include identifiers of the data items of interest and user data (e.g., login data) of a user that is associated with request. The action sub-module 709 can use authorization data 755 that is stored in the data store 750 and user data from the request to determine which actions are available for execution on the one or more data items. The authorization data 755 can include user identifiers for various users and access rights corresponding to the various users. For example, the action sub-module 709 may determine from searching the authorization data 755 based on the user data that a user is allowed to delete, edit, and create data items. The action sub-module 709 can generate a response that includes the available actions for the one or more data items and can send it to the client via the back-end server connection.

The action sub-module 709 can receive a request to perform an action on the database data (e.g., application data 753) from a client via the back-end server connection and can modify the application data 753 that is stored in the data store 750 based on the requested action. The request can include identifiers of data items. For example, the action sub-module 709 can receive a request to delete data items that are stored in the application data 753, search the application data 753 based on the identifiers in the request, and perform the action on the appropriate data (e.g., delete, edit). In another example, the action sub-module 709 receives a request to add data items to the application data 753. The action sub-module 709 can send a response, via the back-end connection, that includes data that is a result of the action performed. For example, the response can include a set of data items that does not include items that are deleted in response to the request. In another example, the response can include a set of data items that has data items that were added in response to the request.

Figure 9:
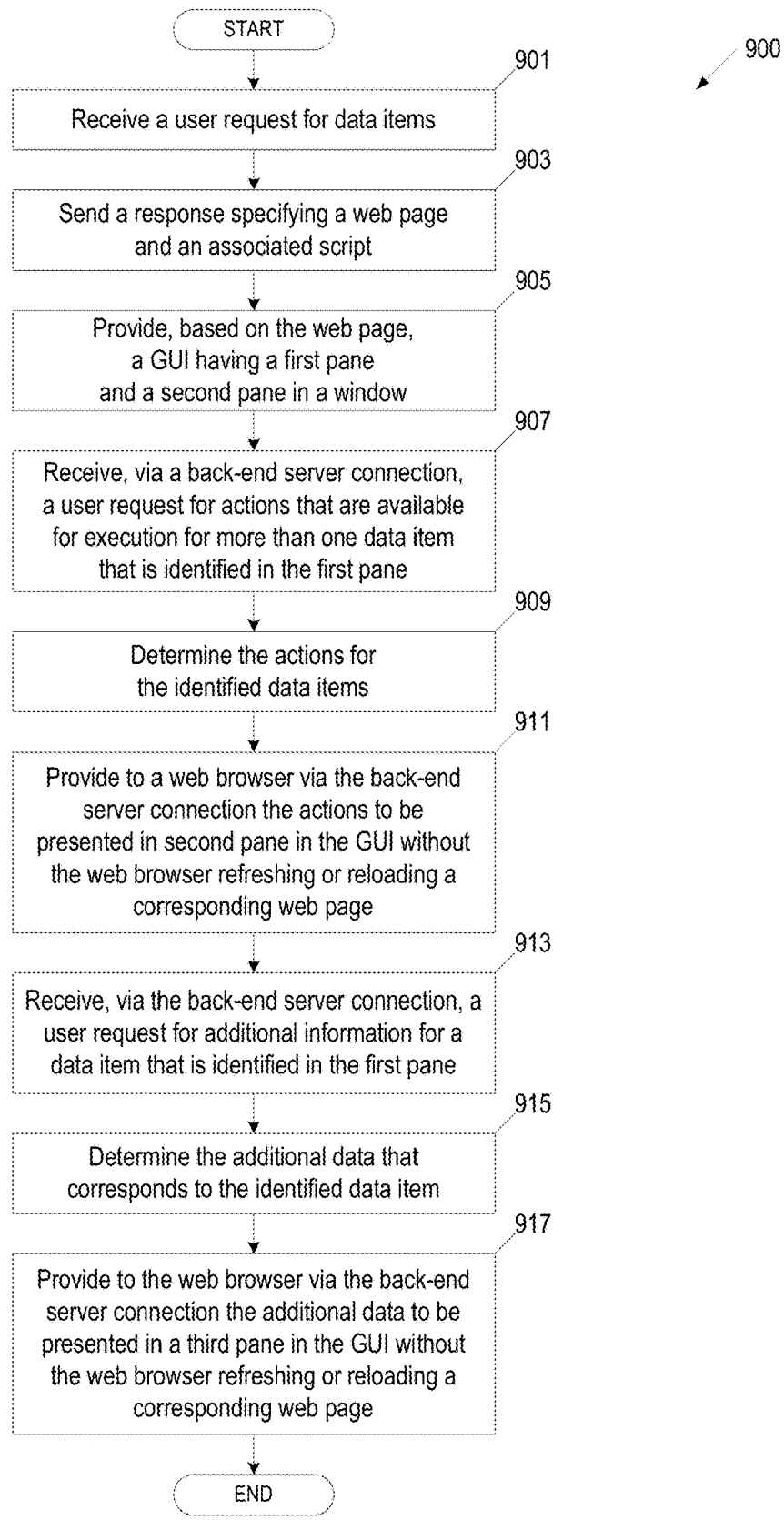
FIG. 9 is a flow diagram of an embodiment of a method for presenting and dynamically updating web data using multiple panes in a window without refreshing or reloading a corresponding web page.

FIG. 9 is a flow diagram of an embodiment of a method 900 for presenting and dynamically updating web data using multiple panes in a window in a GUI without refreshing or reloading a corresponding web page. Method 900 can be performed by processing logic that can comprise hardware (e.g., circuitry, dedicated logic, programmable logic, microcode, etc.), software (e.g., instructions run on a processing device), or a combination thereof. In one embodiment, method 900 is performed by the user interface module 110 hosted by a server 150 of FIG. 1.

At block 901, processing logic receives a user request for data items. For example, a user clicks on a web page and processing logic receives the request from the web browser on a client. At block 903, processing logic sends a response specifying a web page and an associated script. At block 905, processing logic provides, based on the web page, a GUI that includes a first pane and a second pane in a window. The first pane and the second pane can be presented at the same time in the same window in the GUI. The first pane includes a set of data items of a web application. The web application can be a system administration tool for provisioning, configuring, and managing systems. Examples of system administration data items can include, and are not limited to, roles, users, systems, organizations, permissions, etc. The second pane can be a default pane that provides information when one or more data items are identified in the first pane.

At block 907, processing logic receives a request for actions that are available on more than one data item that is identified in the first pane. Processing logic can receive the request via a back-end server connection. The request can include data item identifiers for the identified data items and a user identifier. For example, a user logs in to the web application and clicks on more than one data item in the first pane. The client generates a request that includes the data item identifiers for the selected data items and the user identifier of the user. The client establishes a back-end server connection with the server and sends the request. The back-end server connection can be established, for example, using client-side JavaScript and the AJAX protocol. AJAX allows web pages to be updated asynchronously by exchanging small amounts of data with the server behind the scenes, to update parts of a web page, without reloading or refreshing the whole page. For example, processing logic can receive AJAX calls from a client requesting processing logic to identify actions from a server-side database that are available for execution on the selected data items.

At block 909, processing logic determines the action(s) for the identified data items based on the identifiers in the request and an authorization level of a user. Examples of actions can include, and are not limited to, deleting at least one data item, creating at least one data item, and editing at least one data item. Processing logic can search the authorization data, which is stored in a data store that is coupled to the user interface module, based on the user identifier and the data item identifiers to determine which actions are available for execution on the data items. At block 911, processing logic creates a response that includes the available actions and sends the response to the web browser on the client via the back-end server connection. For example, processing logic determines that a user has permission to delete the identified data items and processing logic sends the delete action to the web browser. The web browser can present the actions in the second pane in the GUI without refreshing or reloading the corresponding web page.

At block 913, processing logic receives a user request for additional information for a data item that is identified in the first pane. A user may select a single data item in the first pane, and the client generates a request that includes the data item identifier for the selected data item. The request may also include the user identifier of the user. Processing logic can receive the request from the client via the back-end server connection.

At block 915, processing logic can search application data, which is stored in a data store (e.g., server-side database) that is coupled to the user interface module, based on a data item identifier in the request to determine which additional data corresponds to the selected data item. Processing logic may also search the database based on a user identifier in the request to identify the additional data for the selected data item. Examples of additional data can include, and are not limited to, permissions, permission type, permission scope, and user interface elements (e.g., delete button, edit button). The user interface elements allow a user to cause one or more actions to be performed on the selected data item.

At block 917, processing logic provides the additional information to the web browser on the client via the back-end server connection. Processing logic can create a response that includes the additional data that corresponds to the identified data item and send the response to the web browser. The web browser can present the additional information in a third pane in the GUI without refreshing or reloading the corresponding web page. The third pane can be visible to a user together with the first pane in the GUI.

Figure 10:
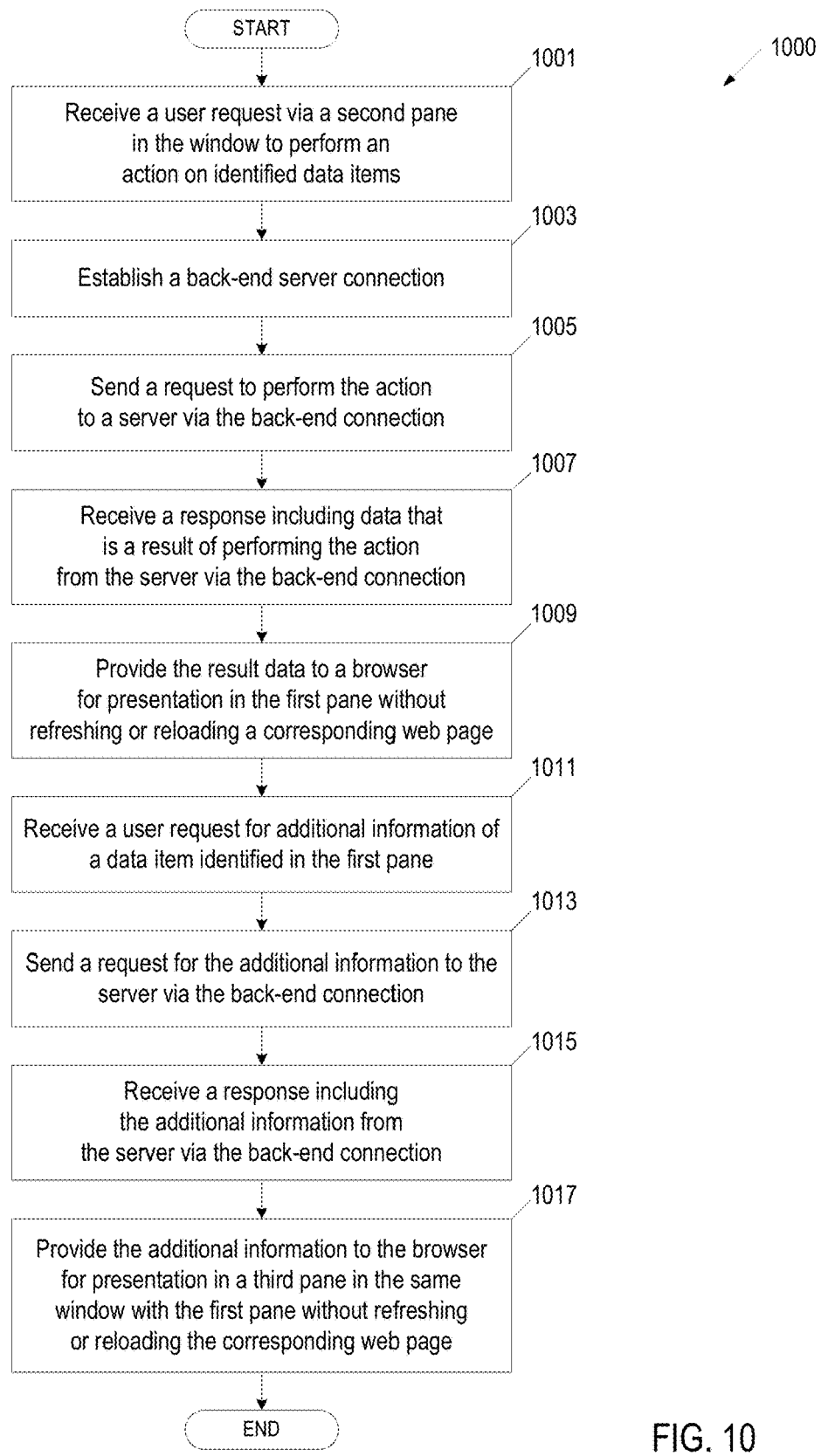
FIG. 10 is a flow diagram of an embodiment of a method for presenting and dynamically updating web data using multiple panes in a window without refreshing or reloading a corresponding web page.

FIG. 10 is a flow diagram of an embodiment of a method 1000 for presenting and dynamically updating web data using multiple panes in a window without refreshing or reloading a corresponding web page. Method 1000 can be performed by processing logic that can comprise hardware (e.g., circuitry, dedicated logic, programmable logic, microcode, etc.), software (e.g., instructions run on a processing device), or a combination thereof. In one embodiment, method 1000 is performed by the back-end server communication framework 145 hosted by a client 140 of FIG. 1.

At block 1001, processing logic receives a user request via a second pane in the window in the GUI to perform an action on the identified data items in the first pane. For example, a user selects a delete button in the second pane to request that the identified data items in the first pane be deleted. At block 1003, processing logic establishing a back-end server connection with a server. For example, processing logic uses client-side JavaScript and the AJAX protocol to establish the back-end server connection. At block 1005, processing logic sends a request to the server via the back-end connection to perform the action. The request can include data item identifiers and an action identifier. For example, the request is for the server to delete the identified items in a database that is coupled to the server. The server can receive the request and delete the identified data items in a database that is coupled to the server.

At block 1007, processing logic receives a response from the server via the back-end server connection. The response can include data to be presented in the first pane that is a result of performing the action. For example, the response can include a data set that does not have the deleted data items. At block 1009, processing logic provides the result data to a browser for presentation in the first pane without the web browser refreshing or reloading the corresponding web page.

At block 1011, processing logic receives a user request for additional information of a data item that is identified in the first pane. For example, a user selects a particular user role in the first pane to request additional information for the particular user role. At block 1013, processing logic sends a request to the server via the back-end connection for the additional information. The request can include an identifier of the data item of interest. The server can receive the request and retrieve the additional information from the database based on the identifier in the request.

At block 1015, processing logic receives a response from the server via the back-end server connection that includes the additional information for the data item of interest. At block 1017, processing logic provides the additional information to the browser for presentation in a third pane without the web browser refreshing or reloading the corresponding web page. The third pane can be made visible to a user together with the first pane. The web browser can present the third pane as a layer on top of the second pane in the window, such that the second pane, or at least a portion of the second pane, is covered by the third pane. Thus, a user can interact with web application data within the same window to perform operations and without leaving a web page and without the web page reloading or refreshing.

The web browser can use animation to present the third pane in the GUI. Animation is a set of effects which can be applied to one or more objects (e.g., third pane) to animate the object. Examples of animation can include, and are not limited, to sliding in an object, flying in an object, or any other motion to present an object in a GUI. The web browser can associate a direction (e.g., horizontal, vertical, diagonal, left to right, right to left, top to bottom, bottom to top, or any combination of such) to an animation motion. In one embodiment, the web browser presents the third pane in the GUI by sliding the third pane over the second pane from left to right.

When a user selects to close the third pane, the web browser removes the third pane from the GUI, such that the third pane is no longer visible to a user. When the third pane is no longer visible to a user, the second pane underneath the third pane becomes visible to a user. The web browser can use animation to remove the third pane from the GUI. For example, the web browser removes the third pane by sliding the third pane from right to left.

Figure 11:
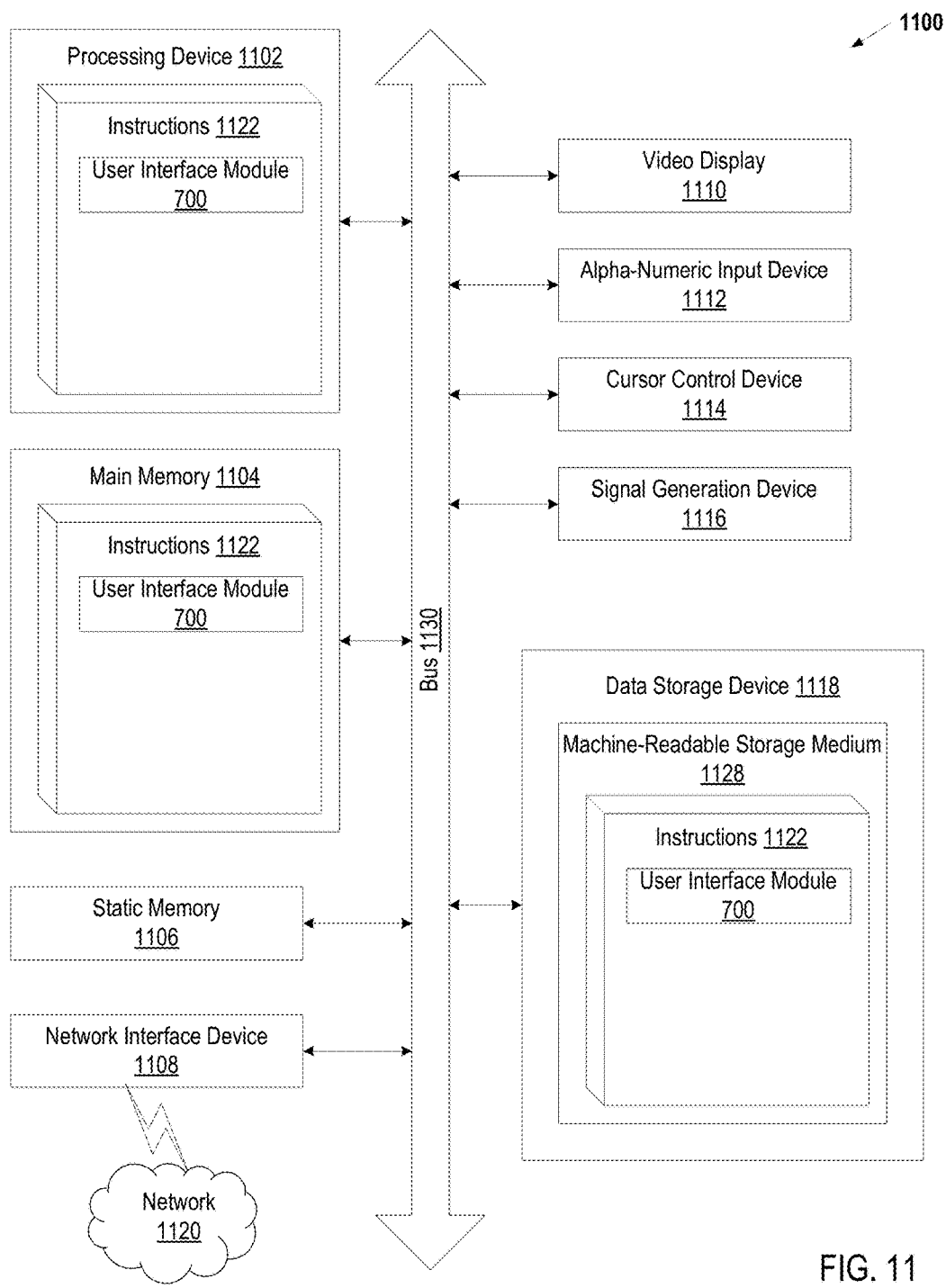
FIG. 11 is a diagram of one embodiment of a computer system for presenting web data using a multi-pane graphical user interface with dynamic panes.

FIG. 11 illustrates a diagram of a machine in the exemplary form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device 1102, a main memory 1104 (e.g., read-only memory (ROM), flash memory, dynamic random access memory (DRAM) such as synchronous DRAM (SDRAM), double data rate (DDR SDRAM), or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1122 for performing the operations and steps discussed herein.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a machine-readable storage medium 1128 (also known as a computer-readable medium) on which is stored one or more sets of instructions or software 1122 embodying any one or more of the methodologies or functions described herein. The instructions 1122 may also reside, completely or at least partially, within the main memory 1104 and/or within the processing device 1102 during execution thereof by the computer system 1100, the main memory 1104 and the processing device 1102 also constituting machine-readable storage media.

In one embodiment, the instructions 1122 include instructions for a module (e.g., user interface module 700 of FIG. 2) and/or a software library containing methods that call a translation module. While the machine-readable storage medium 1128 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical media and magnetic media.

Thus, techniques for presenting web data using a multi-pane graphical user interface with dynamic panes are described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "providing," "receiving," "determining," "performing," "identifying," "presenting," "communicating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
receiving a selection of one or more system administration data items in a data item pane in a web application graphical user interface (GUI), the web application GUI comprising the data item pane and a multi-selection pane in a window of the web application GUI, the data item pane comprising a set of system administration data items of the web application;
determining a number of the one or more system administration data items from the set of system administration data items of the web application that have been selected in the data item pane;
responsive to determining that a single system administration data item of the set of system administration items has been selected in the data item pane, sliding, by a processing device, another pane with a display of permission information for the selected system administration data item in a horizontal direction away from the data item pane within the window of the web application GUI to cover the multi-selection pane in the window, wherein content of the data item pane is fully visible in the window of the web application GUI;
responsive to determining that a plurality of the system administration data items of the set of system administration items have been selected in the data item pane, providing one or more actions to remove permissions from each system administration data item of the selected plurality of system administration data items, the one or more actions being provided in the multi-selection pane;

receiving a request to perform an action of the one or more actions for the selected plurality of system administration data items in the data item pane to remove a permission from each of the plurality of system administration data items selected in the data item pane from the window of the web application GUI, the request corresponding to a selection of the action at the multi-selection pane; and responsive to receiving the request, removing, by the processing device, the permission from each of the plurality of system administration data items selected in the data item pane from the window of the web application GUI.

2. The method of claim 1, further comprising:

sending, via a back-end server communication framework, a data identifier for the set of system administration data items and a user identifier to determine whether a user is authorized to access the permission information for the plurality of the system administration data items of the set of system administration data items;

receiving, via the back-end server communication framework, the permission information for the plurality of the system administration data items in view of the user being authorized; and displaying the permission information in the another pane in the web application GUI without a web browser refreshing or reloading the web application GUI.

3. The method of claim 1, further comprising:

causing display of a user interface element for an edit action, wherein selection of the user interface element edits the permission for each of the plurality of the system administration data items.

4. The method of claim 3, further comprising:

determining the edit action and the user interface element for the edit action to display in view of an authorization level associated with a user.

5. The method of claim 3, wherein the edit action comprises at least one of deleting data for each of the plurality of system administration data items in the database, adding data for each of the plurality of system administration data items to the database, or editing data for the each of the plurality of system administration data items in the database.

6. A system comprising:

a memory; and a processing device, operatively coupled with the memory, to:

receive a selection of one or more system administration data items in a data item pane in a web application graphical user interface (GUI), the web application GUI comprising the data item pane and a multi-selection pane in a window of the web application GUI, the data item pane comprising a set of system administration data items of the web application;

determine a number of the one or more system administration data items from the set of system administration items of the web application that have been selected in the data item pane;

responsive to determining that a single system administration data item of the set of system administration items has been selected in the data item pane, slide another pane with a display of permission information for the selected system administration data item in a horizontal direction away from the data item pane within the window of the web application GUI to cover the multi-selection pane in the window, wherein content of the data item pane is fully visible in the window of the web application GUI;

responsive to determining that a plurality of the system administration data items of the set of system administration items have been selected in the data item pane, provide one or more actions to remove permissions from each system administration item of the selected plurality of system administration data items, the one or more actions being provided in the multi-selection pane;

receive a request to perform an action of the one or more actions for the selected plurality of system administration data items in the data item pane to remove a permission from each of the plurality of system administration data items selected in the data item pane from the window of the web application GUI, the request corresponding to a selection of the action at the multi-selection pane; and responsive to receiving the request, remove the permission from each of the plurality of system administration data items selected in the data item pane from the window of the web application GUI.

7. The system of claim 6, wherein the processing device is further to:

send, via a back-end server communication framework, a data identifier for the system administration data item and a user identifier to determine whether a user is authorized to access the permission information for the plurality of the system administration data items of the set of system administration data items;

receive, via the back-end server communication framework, the permission information for the plurality of the system administration data items in view of the user being authorized; and display the permission information in the another pane in the web application GUI without a web browser refreshing or reloading the corresponding web application GUI.

8. The system of claim 6, wherein the processing device is further to:

cause display of a user interface element for an edit action, wherein selection of the user interface element edits the permission for each of the plurality of the system administration data item.

9. The system of claim 8, wherein the processing device is further to:

determine the edit action and the user interface element for the edit action to display in view of an authorization level associated with a user.

10. The system of claim 8, wherein selection of the user interface element for the edit action, the processing device is to at least one of delete data for each of the plurality of the system administration data items in the database, add data for each of the plurality of the system administration data items to the database, or edit data for each of the plurality of the system administration data items in the database.

11. A non-transitory computer-readable storage medium including instructions that, when executed by a processing device, cause the processing device to:

receive a selection of one or more system administration data items in a data item pane in a web application graphical user interface (GUI), the web application GUI comprising the data item pane and a multi-selection pane in a window of the web application GUI, the data item pane comprising a set of system administration data items of the web application;

determine a number of the one or more system administration data items from the set of system administration items of the web application that have been selected in the data item pane;

responsive to determining that a single system administration data item of the set of system administration items has been selected in the data item pane, slide another pane with a display of permission information for the selected system administration data item in a horizontal direction away from the data item pane within the window of the web application GUI to cover the multi-selection pane in the window, wherein content of the data item pane is fully visible in the window of the web application GUI;

responsive to determining that a plurality of the system administration data items of the set of system administration items have been selected in the data item pane, provide, by the processing device, one or more actions to remove permissions from each system administration item of the selected plurality of system administration data items, the one or more actions being provided in the multi-selection pane;

receive a request to perform an action of the one or more actions for the selected plurality of system administration data items in the data item pane to remove a permission from each of the plurality of system administration data items selected in the data item pane from the window of the web application GUI, the request corresponding to a selection of the action at the multi-selection pane; and responsive to receiving the request, remove the permission from each of the plurality of system administration data items selected in the data item pane from the window of the web application GUI.

12. The non-transitory computer-readable storage medium of claim 11, wherein the processing device is further to:
  send, via a back-end server communication framework, a data identifier for the system administration data item and a user identifier to determine whether a user is authorized to access the permission information for the plurality of the system administration data items of the set of system administration data items;
  receive, via the back-end server communication framework, the permission information for the plurality of the system administration data items in view of the user being authorized; and
  display the permission information in the another pane in the web application GUI without a web browser refreshing or reloading the corresponding web application GUI.

13. The non-transitory computer-readable storage medium of claim 11, wherein the processing device is further to:
  cause display of a user interface element for an edit action, wherein selection of the user interface element edits the permission for each of the plurality of the system administration data items.

14. The non-transitory computer-readable storage medium of claim 13, wherein the processing device is further to:
  determine the edit action and the user interface element for the edit action to display in view of an authorization level associated with a user.

15. The non-transitory computer-readable storage medium of claim 13, wherein the edit action comprises at least one of deleting data for each of the plurality of system administration data items in the database, adding data for each of the plurality of system administration data items to the database, or editing data for the each of the plurality of system administration data items in the database.

* * * * *